(12) United States Patent
Lee et al.

(10) Patent No.: US 8,727,735 B2
(45) Date of Patent: May 20, 2014

(54) ROTOR ASSEMBLY AND REVERSIBLE TURBINE BLADE RETAINER THEREFOR

(75) Inventors: Michael Lee, Peabody, MA (US); David Coburn, Salem, NH (US); Joseph Fagan, Brookline, MA (US)

(73) Assignee: General Electric Company, Schenectady, NY (US)

( * ) Notice: Subject to any disclaimer, the term of this patent is extended or adjusted under 35 U.S.C. 154(b) by 398 days.

(21) Appl. No.: 13/173,575

(22) Filed: Jun. 30, 2011

(65) Prior Publication Data

US 2013/0004319 A1 Jan. 3, 2013

(51) Int. Cl.
*F01D 5/32* (2006.01)

(52) U.S. Cl.
USPC ......... 416/220 R; 416/95; 416/96 R; 416/248

(58) Field of Classification Search
USPC .......... 416/219 R, 220 R, 221, 248, 95, 96 R, 416/97 R
See application file for complete search history.

(56) References Cited

U.S. PATENT DOCUMENTS

| | | | | |
|---|---|---|---|---|
| 2,277,484 | A | * | 3/1942 | Flanders .................. 416/220 R |
| 4,813,850 | A | * | 3/1989 | Partington ............... 416/219 R |
| 4,820,126 | A | * | 4/1989 | Gavilan ....................... 416/221 |
| 5,018,943 | A | | 5/1991 | Corsmeier |
| 5,275,534 | A | | 1/1994 | Cameron |
| 5,302,086 | A | | 4/1994 | Kulesa |
| 5,338,154 | A | | 8/1994 | Meade |
| 5,350,279 | A | | 9/1994 | Prentice |
| 5,622,475 | A | * | 4/1997 | Hayner et al. ............ 416/220 R |
| 5,735,671 | A | | 4/1998 | Brauer |
| 6,884,028 | B2 | | 4/2005 | Brauer |
| 7,238,008 | B2 | | 7/2007 | Normoyle |
| 2004/0062643 | A1 | * | 4/2004 | Brauer et al. ............. 415/173.7 |
| 2007/0258816 | A1 | * | 11/2007 | Bouchard et al. ........ 416/193 A |
| 2011/0311365 | A1 | * | 12/2011 | Witt .......................... 416/219 R |

FOREIGN PATENT DOCUMENTS

DE    10 2009 010 748 A1 * 9/2010 ............. F04D 29/34

* cited by examiner

*Primary Examiner* — Christopher Verdier
(74) *Attorney, Agent, or Firm* — William Scott Andes; Trego, Hines & Ladenheim, PLLC

(57) ABSTRACT

A blade retainer for a gas turbine engine includes a plate-like member with an arcuate outer face, an opposed inner face, and two spaced-apart end faces. The member has an outer portion disposed adjacent the outer face, and an inner portion disposed adjacent the inner face, and a wedge-shaped recess with a concave radiused valley is formed in the inner portion adjacent each end face. The retainer is left-right symmetrical.

7 Claims, 4 Drawing Sheets

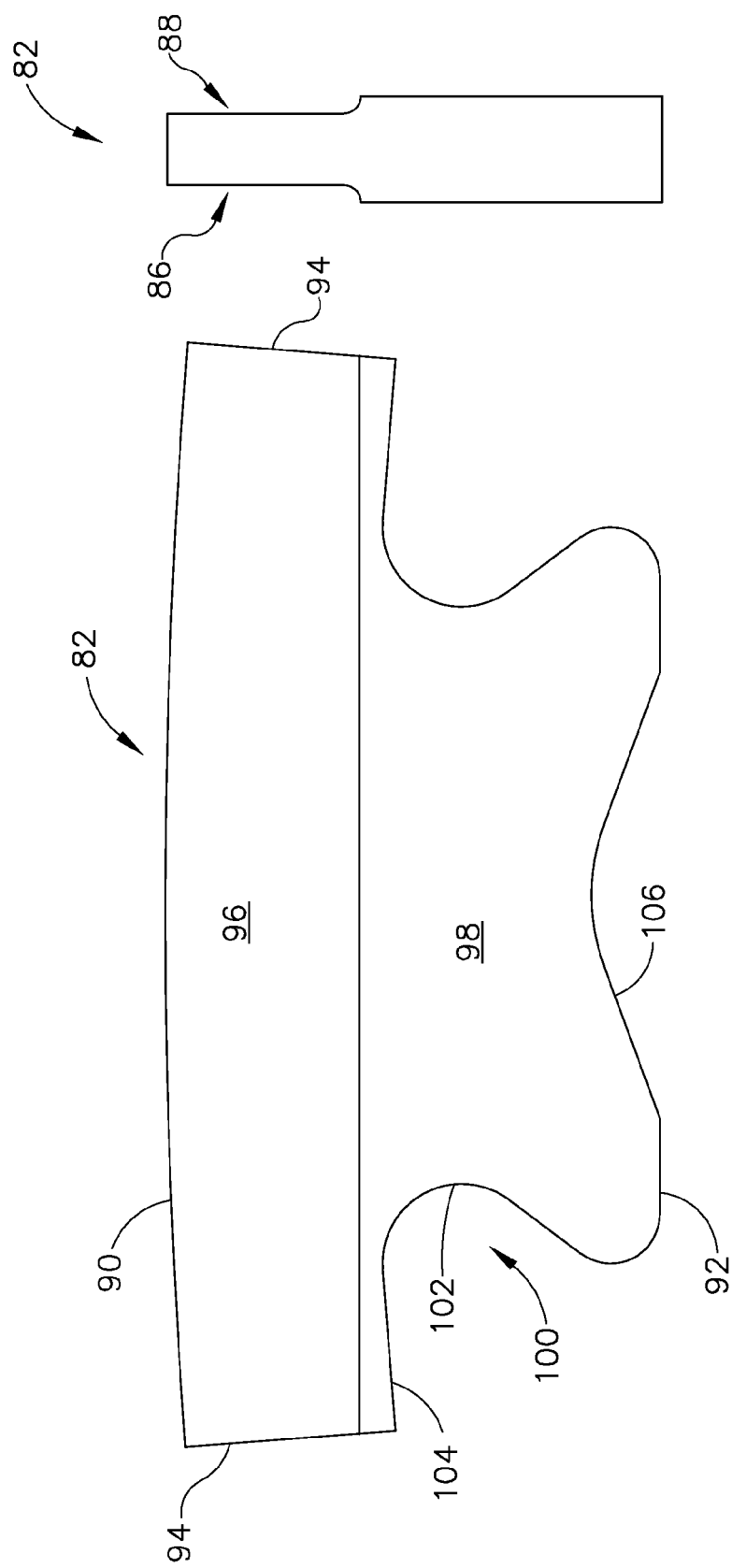

US 8,727,735 B2

ROTOR ASSEMBLY AND REVERSIBLE TURBINE BLADE RETAINER THEREFOR

BACKGROUND OF THE INVENTION

This invention relates generally to gas turbine rotor assemblies and more particularly to a blade retention apparatus for a gas turbine engine rotor assembly.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

A turbine rotor comprises a row of rotor blades mounted to the perimeter of a rotor disk that rotates about the centerline axis of the engine. Each rotor blade typically includes a shank portion having a dovetail for mounting the blade to the rotor disk and an airfoil that extracts useful work from the hot gases exiting the combustor. A blade platform, formed at the junction of the airfoil and the shank portion, defines the radially inner boundary for the hot gas stream. The turbine nozzles are usually segmented around the circumference thereof to accommodate thermal expansion. Each nozzle segment has one or more nozzle vanes disposed between inner and outer bands for channeling the hot gas stream into the turbine rotor.

To improve turbine engine performance, flowpath temperatures and blade tip speeds are increased. These conditions increase centrifugal loads and metal temperatures, requiring robust turbine blade and blade retainer designs. Rotor cavities are shielded from flowpath temperatures by overlap seals, formed by a combination of sealing flanges, often referred to as "angel wings", which are mounted on the blades, blade retainers, or stator. This configuration isolates flowpath gas ingestion to one or more buffer cavities. In addition, cooler higher-pressure air from inside is introduced radially outward into the buffer cavities to mix with and to purge the higher temperature gases out of the cavity. The outermost overlap is located on a rotating turbine blade with the inboard overlap located on a static nozzle. These components are made from materials capable of withstanding higher temperatures. The innermost overlap is located on a rotating cooling plate that is made from a material with a lower temperature capability. The cooling plate, however, must extend into the higher temperature zone of the buffer cavity in order to provide sealing and axial retention of the turbine blades, and is often limited by the temperature capability of the material requiring an increased supply of cooler air. This increased cooling air flow directly impacts performance.

Accordingly, there is a need for a turbine blade retainer which is suitable for high temperature operation.

BRIEF SUMMARY OF THE INVENTION

This need is addressed by the present invention, which provides a turbine disk with a cooling plate that restrains blade retainers against an array of turbine blades, thereby retaining the blades in axial position relative to the disk. The blade retainers are left-right symmetrical and therefore reversible in assembly.

According to one aspect of the invention, a blade retainer for a gas turbine engine includes a plate-like member with an arcuate outer face, an opposed inner face, and two spaced-apart end faces. The member has an outer portion disposed adjacent the outer face, and an inner portion disposed adjacent the inner face, and a wedge-shaped recess with a concave radiused valley is formed in the inner portion adjacent each end face. The retainer is left-right symmetrical.

According to another aspect of the invention, a rotor assembly disposed about an axis includes: a disk having an array of axially extending slots formed in an outer periphery thereof; a plurality of blades, each of the blades having a dovetail disposed in one of the slots; an annular cooling plate having a radially inner portion and a radially outer portion, the radially inner portion being attached to the disk and the radially outer portion including an annular arm extending axially towards the disk; and a plurality of blade retainers, each of the arcuate blade retainers having a face disposed against the blades, wherein the arm of the annular cooling plate contacts and restrains the blade retainers in an axial direction against the blades, and wherein each of the retainers is left-right symmetrical.

BRIEF DESCRIPTION OF THE DRAWINGS

The invention may be best understood by reference to the following description taken in conjunction with the accompanying drawing figures in which:

FIG. 4 is a front elevational view of the blade retainer of FIG. 3; and

FIG. 5 is a side view of the blade retainer of FIG. 3.

DETAILED DESCRIPTION OF THE INVENTION

Figure 1:
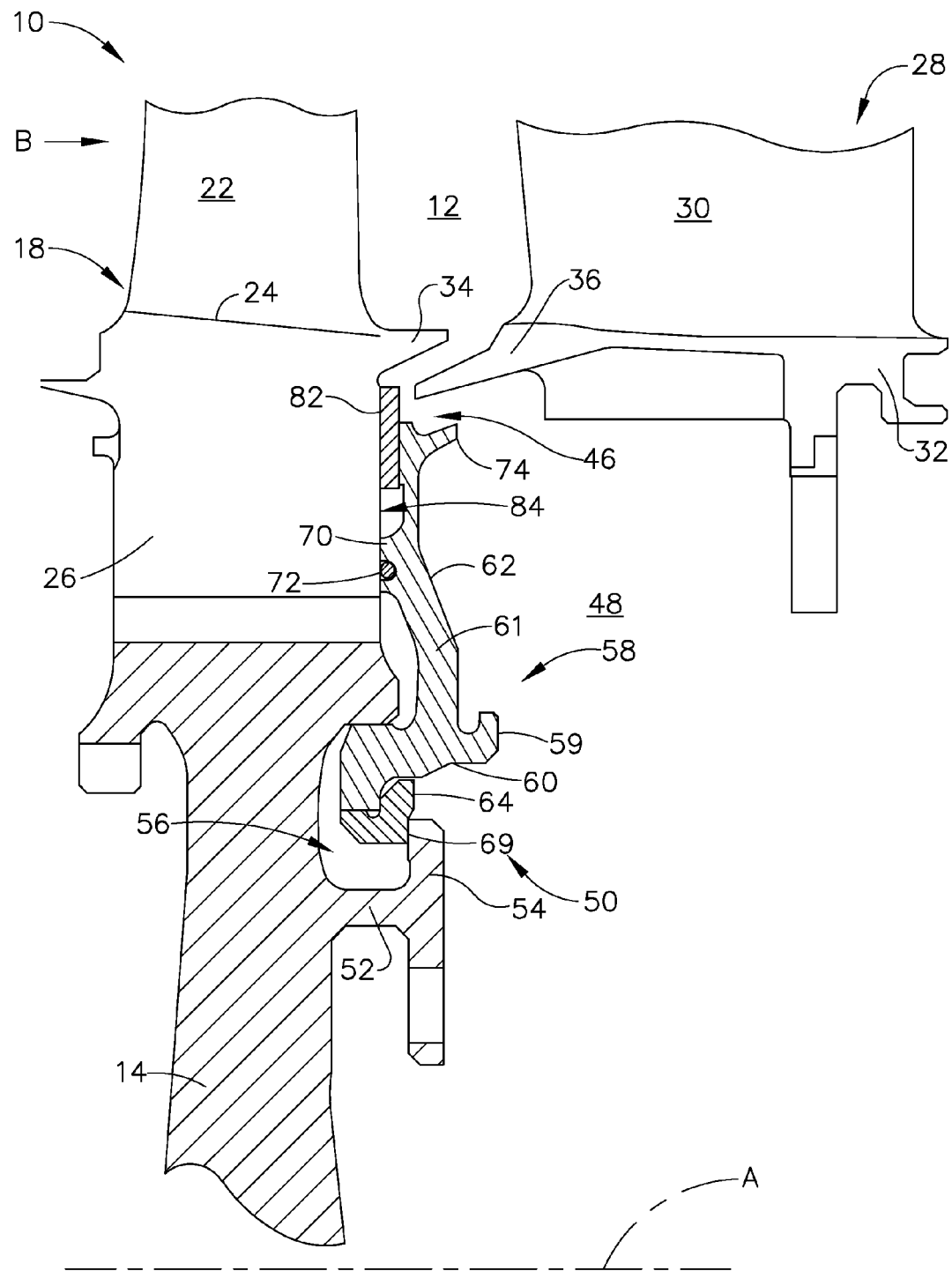
FIG. 1 is a schematic cross-sectional view of a portion of a turbine section of a gas turbine engine constructed in accordance with the present invention.

Referring to the drawings wherein identical reference numerals denote the same elements throughout the various views, FIG. 1 shows a fragmentary cross-sectional view of a turbine rotor assembly 10 of a gas turbine engine which is disposed about a longitudinal axis labeled A. As used herein, the term "axial" or "longitudinal" refers to a direction parallel to this axis, while the term "radial" refers to a direction perpendicular to this axis. Although a high pressure turbine rotor is shown, the blade retention design of the present invention is equally applicable to other assemblies, such as low pressure turbine rotors or compressor rotors. Combustion gases pass through the flowpath 12 of the rotor assembly 10, generally in the direction of the arrow labeled B. The rotor assembly 10 includes an annular disk 14. The disk 14 has alternating dovetail slots 16 and dovetail posts 20 (see FIG. 2) around its rim. The dovetail slots 16 receive a plurality of turbine blades 18. Each turbine blade 18 comprises an airfoil 22, a platform 24, and a shank 26 (also referred to as a "dovetail") which is formed into a dovetail shape complementary to that of the dovetail slot 16. The turbine blade 18 has an annular first stationary sealing flange 34 that extends axially forward towards the disk 14. The term "sealing flange" refers to an annular flange or extension intended to cooperate with another similar extension to form an overlapping seal. This type of flange or extension is commonly referred to in the turbomachinery art as an "angel wing".

A stator (or nozzle) assembly 28 for the subsequent turbine stage is disposed axially rearward of the disk 14. The stator assembly 28 comprises a plurality of airfoils 30 (also referred to as nozzle vanes) which are attached to a circumferentially extending inner band 32. The inner band 32 has an annular second stationary sealing flange 36 that extends axially forward towards the disk 14. The first and second stationary sealing flanges 34 and 36 are positioned with respect to each other so as to define a buffer cavity 46 with a generally "C"-shaped cross-section between the combustion gas flowpath 12 and the rotor cavity 48. This arrangement reduces leakage of combustion gases from the flowpath 12 to the rotor cavity 48. Pressurized cooling air may also be provided to the rotor cavity 48 in accordance with known practice.

Considering the disk 14 in more detail, the turbine blades 18 are restrained axially in the dovetail slots 16 of the disk 14 by a retainer assembly 50 which is attached to the disk 14. A portion of the disk 14 is formed into an annular hook 52, which includes a radially extending flange 54. An annular cavity 56 is defined between the flange 54 of the circumferential hook 52 and the remainder of the disk 14.

An annular cooling plate 58 is attached to the disk 14. The cooling plate 58 is a generally disk-shaped component which has a radially inner portion 59 that includes an axially extending, generally cylindrical hub 60, and a radially outer portion 61 that defines an arm 62 that extends radially outward and axially towards the disk 14. The axially extending hub 60 is received in the cavity 56 of the disk 14. A retaining ring 64, such as a conventional split ring, is installed in the cavity 56. The retaining ring 64 bears against an axially facing bearing surface 69, which is part of the flange 54 of the circumferential hook 52, to prevent axially rearward movement of the cooling plate 58.

A forward facing seal wire boss 70 may be disposed near the radially outer end of the arm 62. The seal wire boss 70 has a circumferential groove which accepts a conventional sealing wire 72 in a known manner. An annular aft flange 74 extends axially rearward from the arm 62. The aft flange 74 acts as a discourager seal to direct any purge flow leakage from the rotor cavity 48 axially rearward, and also causes the cooling plate 58 to put an axially forward force on the blade retainers 82 (described below) under centrifugal loading.

A plurality of blade retainers 82 are disposed against the aft surfaces 84 of the blades 18. Each blade retainer 82 is generally arcuate in shape and includes opposed forward and aft faces 86 and 88 (seen in FIG. 5). The blade retainers 82 are secured axially against the aft surfaces 84 of the direction by the cooling plate 58.

Figure 3:
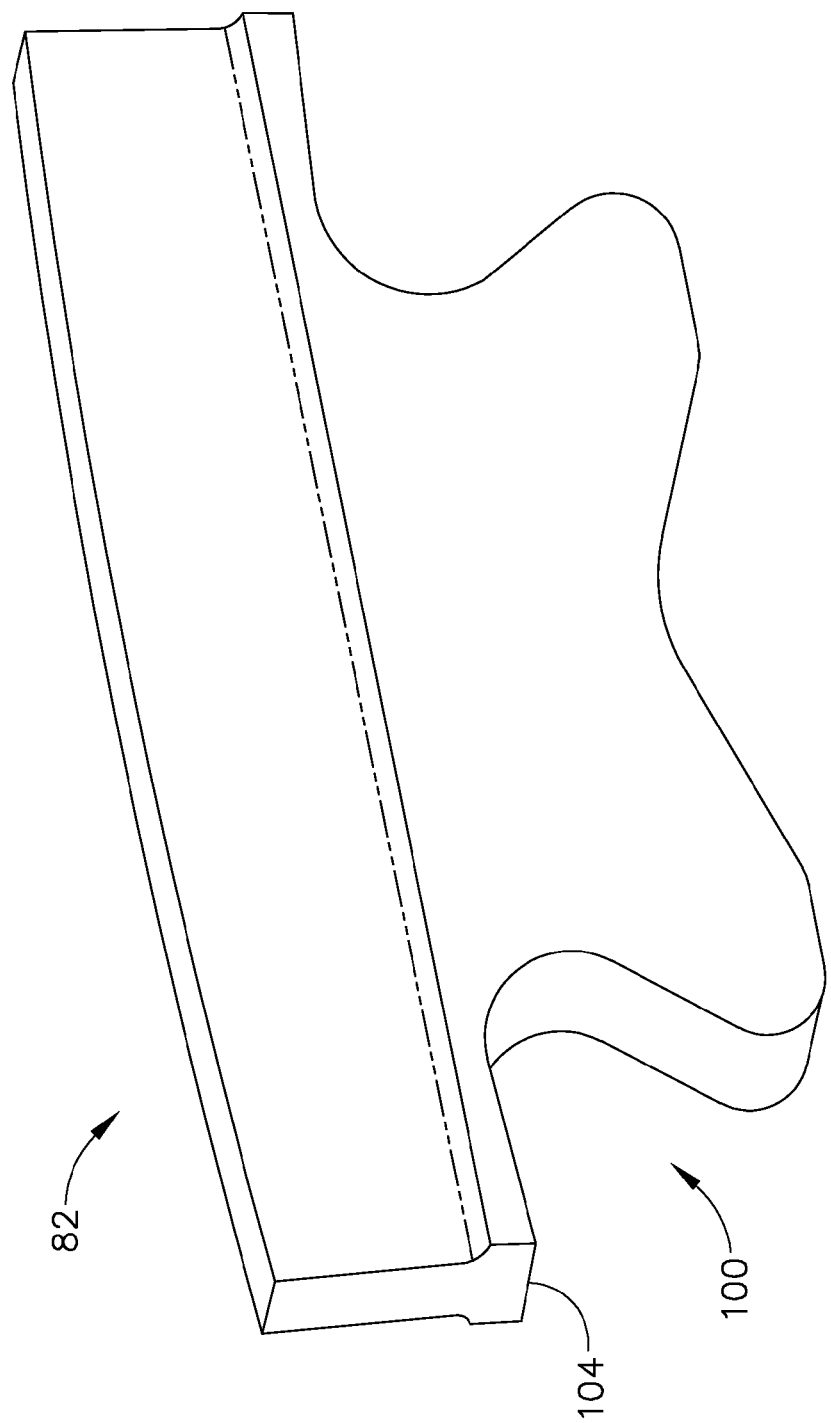
FIG. 3 is a perspective view of a blade retainer for use with the present invention.

FIGS. 3-5 illustrate a exemplary blade retainer 82 in more detail. Each blade retainer 82 is a single piece which may be cast or machined from any suitable material having adequate strength at the expected operating temperatures. For a high pressure turbine rotor, nonlimiting examples of suitable materials include nickel- or cobalt-based superalloys.

The retainer 82 is a plate-like member with an arcuate outer face 90, an opposed inner face 92, and spaced-apart end faces 94. An outer portion 96, adjacent the outer face 90, is reduced in axial thickness compared to an inner portion 98 adjacent the inner face 92. As illustrated in FIG. 5, the outer portion 96 may be substantially reduced in axial thickness compared to the inner portion 98. A wedge-shaped recess 100 with a concave radiused valley 102 is formed in the inner portion 98 adjacent each end face 94. One leg of each recess 100 is denoted a sealing face 104 and is "angled" radially outward from a distal to a proximate end, or in other words it forms an acute angle with the adjacent end face 94. A notch 106 is formed in the inner face 92 to reduce the mass of the blade retainer 82. The entire blade retainer 82 and all of its individual features are left-right symmetrical, so a blade retainer 82 can be installed with either the forward or aft face 86 or 88 against the aft surfaces 84 of the blades 18 and will fit and function identically in either case. The blade retainers 82 may thus be referred to as being "reversible".

Figure 2:
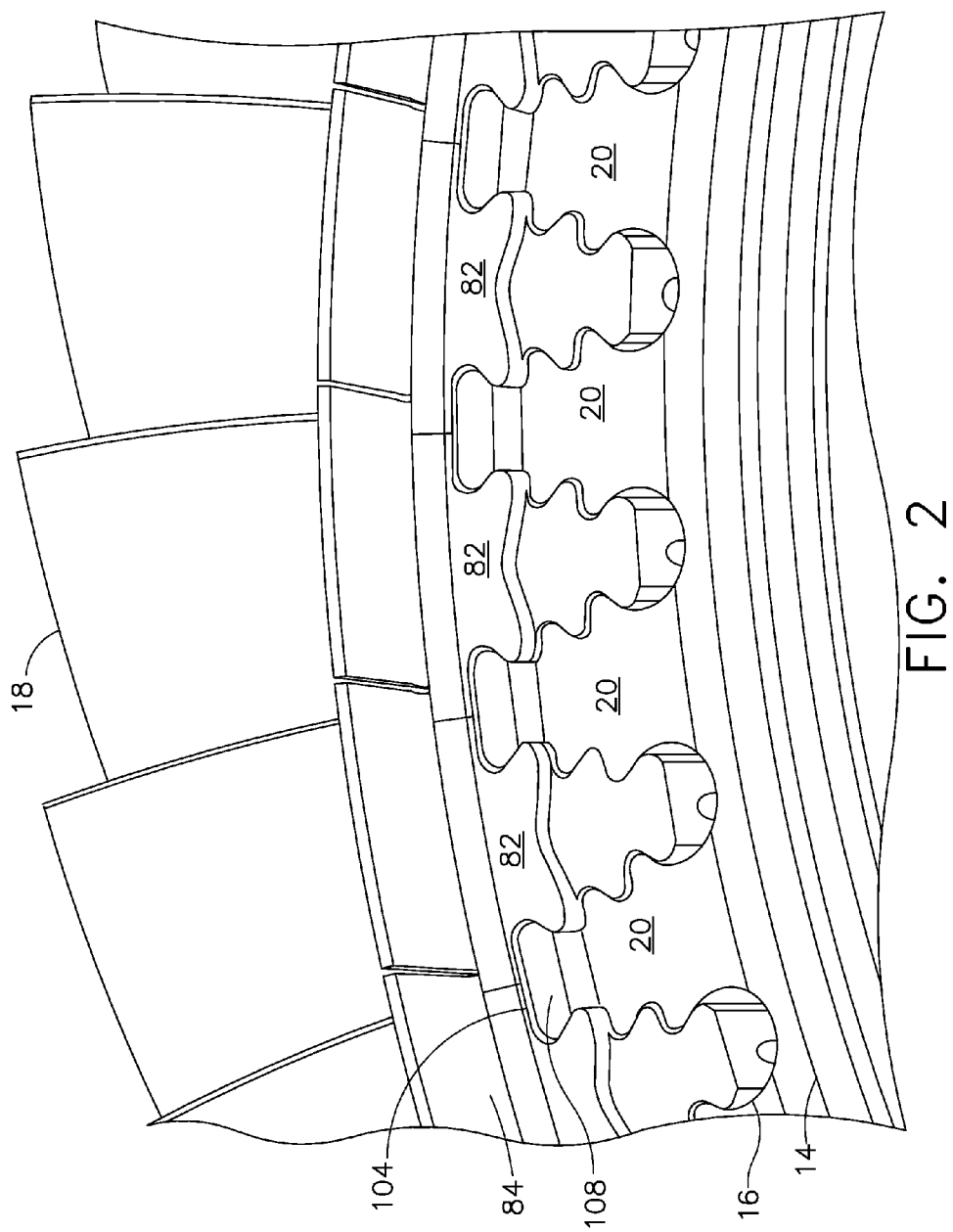
FIG. 2 is an aft elevational view of a turbine rotor shown in FIG. 1.

FIG. 2 shows a view from the rear looking forward at the disk 14. In this view, the cooling plate 58 and other details have been removed for clarity. The blade retainers 82 are arranged in a circumferential array around the periphery of the disk 14. The forward faces 86 (or the aft faces 88) of the blade retainers 82 bear against the aft surfaces 84 of the blades 18 and therefore prevent aft axial movement of the blades 18. Each disk post 20 includes an extension 108 at its radially outer end. The extension 108 protrudes axially aft beyond the remainder of the disk post 20. At least the sealing face 104 of the retainer 82, which defines a portion of the recess 100 as noted above, abuts the radially outboard surface of the extension 108. This supports the retainer 82 in the radial direction (i.e. prevents it from falling radially inboard when the disk 14 is not turning). The angled sealing face 104 contacts the extension's outboard surface in a line contact or semi-line contact, to discourage airflow leakage. The protrusion of the inner portions 98 of the retainers 82 radially inward below the extensions 108 prevents tangential motion of the retainers 82 relative to the disk 14.

The blade retainer 82 and the associated blade retention assembly described herein have several beneficial technical effects. In particular, the cooling plate 58 does not need to extend radially outward into the hotter upper part of the buffer cavity 46, minimizing the exposure of the cooling plate 58 to the hotter gas mix in the outer overlap of upper buffer cavity. Furthermore, the blade retainer 82 is small and therefore lightweight, and fully reversible which prevents mis-assembly.

Although the retainer assembly of the present invention has been described with respect to an aft surface of a rotor assembly, it is noted that the present invention is equally suitable for use with a forward surface of a rotor. That is, it could be used to prevent axially forward motion of a blade.

The foregoing has described a blade retention assembly and a blade retainer therefore. While specific embodiments of the present invention have been described, it will be apparent to those skilled in the art that various modifications thereto can be made without departing from the spirit and scope of the invention as defined in the appended claims.

What is claimed is:

1. A rotor assembly disposed about an axis, comprising:
   a disk having an array of axially extending slots formed in an outer periphery thereof, each slot being flanked by a dovetail post, and each dovetail post including an extension disposed at a radially outer end thereof, the extension protruding axially from the remainder of the dovetail post;
   a plurality of blades, each of the blades having a dovetail disposed in one of the slots;
   an annular cooling plate having a radially inner portion and a radially outer portion, the radially inner portion being attached to the disk and the radially outer portion including an annular arm extending axially towards the disk;
   a plurality of blade retainers, each blade retainer being a plate-like member with an arcuate outer face, an opposed inner face, and spaced-apart end faces, wherein a wedge-shaped recess with a concave radiused valley is formed in the inner portion adjacent each end face, wherein at least a part of the recess of each blade retainer abuts one of the extensions; and each of the blade retainers having a forward face disposed against the blades, wherein the arm of the annular cooling plate contacts and restrains the blade retainers in an axial direction against the blades.

2. The rotor assembly of claim 1 wherein an outer portion of each blade retainer disposed adjacent the outer face is substantially reduced in axial thickness compared to an inner portion disposed adjacent the inner face.

3. The rotor assembly of claim 1 wherein a portion of each recess includes a sealing face which forms an acute angle with an adjacent end face.

4. The rotor assembly of claim 1 wherein a notch is formed in the inner face.

5. The rotor assembly of claim 1 wherein the radially inner portion of the annular cooling plate is received in an annular cavity formed in the disk.

6. The rotor assembly of claim 5 further including a retainer ring disposed in the annular cavity adjacent the annular cooling plate.

7. The rotor assembly of claim 5 wherein the radially inner portion of the annular cooling plate defines a generally cylindrical, axially extending hub.

* * * * *